Feb. 16, 1943. H. N. LUMM 2,310,974
INSTRUMENT FIELD TESTING SET
Filed April 5, 1940 5 Sheets-Sheet 2
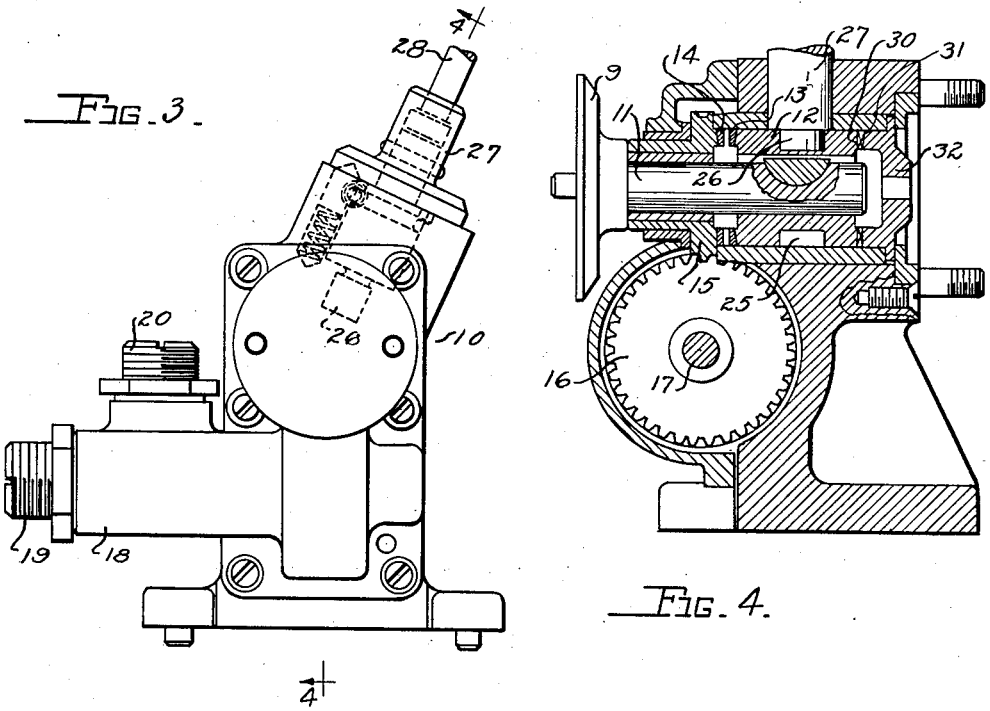
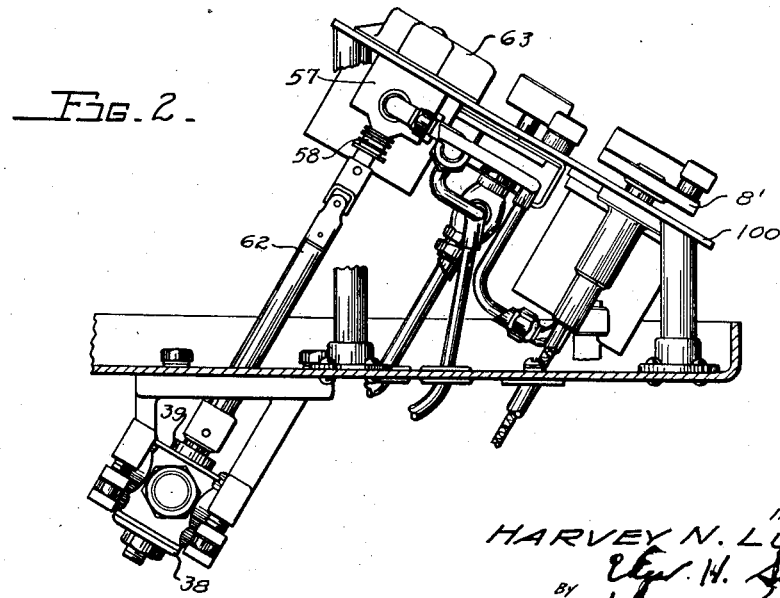
INVENTOR
HARVEY N. LUMM
BY
ATTORNEYS Feb. 16, 1943.    H. N. LUMM    2,310,974
INSTRUMENT FIELD TESTING SET
Filed April 5, 1940    5 Sheets-Sheet 3

INVENTOR
HARVEY N. LUMM

Feb. 16, 1943.   H. N. LUMM   2,310,974
INSTRUMENT FIELD TESTING SET
Filed April 5, 1940   5 Sheets-Sheet 4

INVENTOR
HARVEY N. LUMM
BY
ATTORNEYS

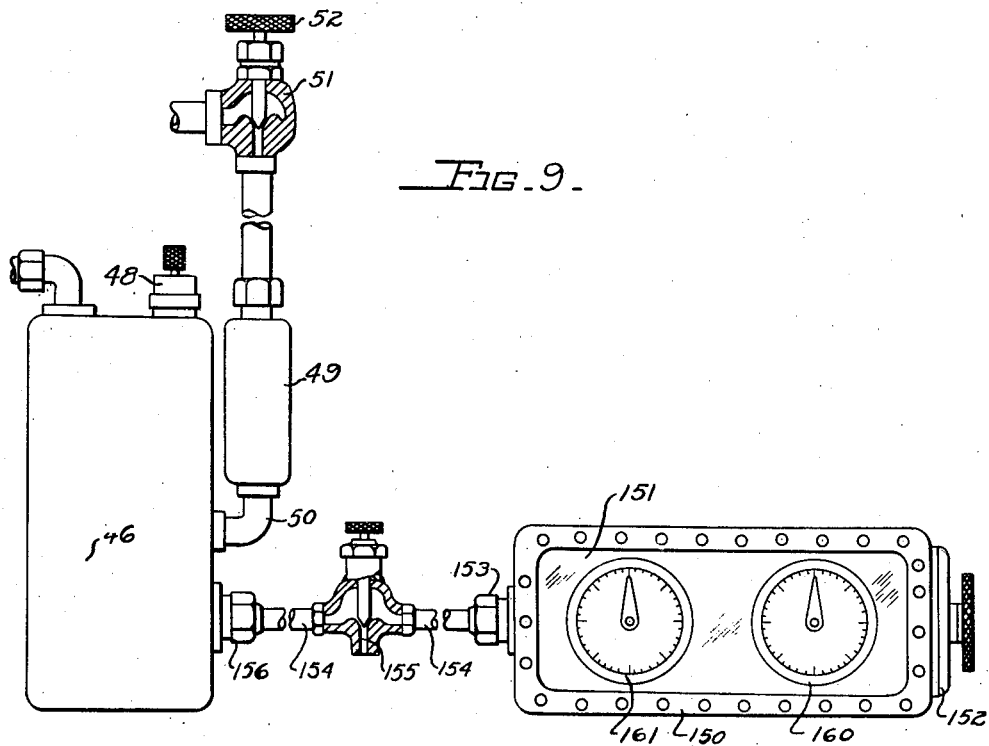
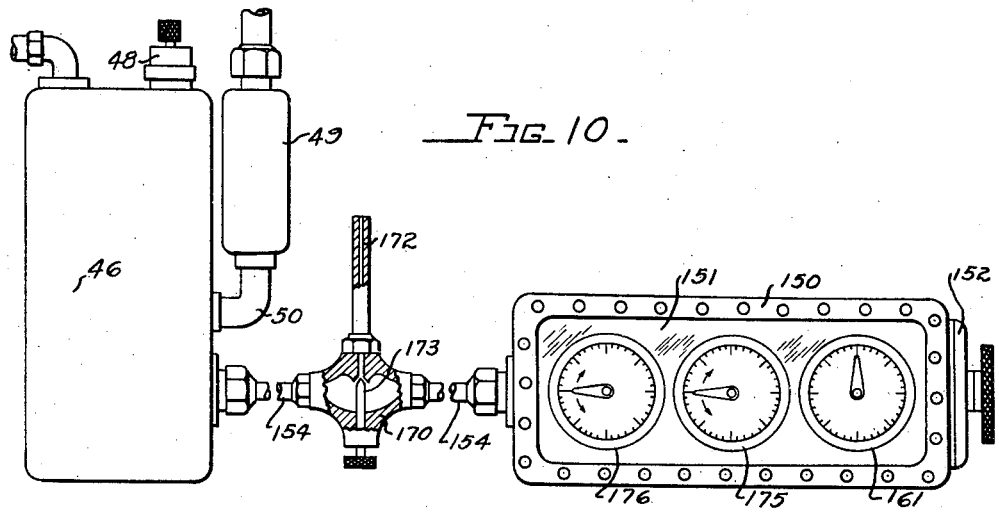

Patented Feb. 16, 1943

2,310,974

UNITED STATES PATENT OFFICE 2,310,974

INSTRUMENT FIELD TESTING SET

Harvey Newton Lumm, Dayton, Ohio

Application April 5, 1940, Serial No. 328,055

9 Claims. (Cl. 73—51)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to testing apparatus and more particularly relates to a portable instrument field testing set for making tests on various aircraft instruments without removing the instruments from the airplane.

Portable devices for testing aircraft instruments have been used in the art and a resumé of the known practice of the prior art is contained in an article entitled "A course for ground engineers, part 1X," by R. W. Sloley in the British publication, "Aircraft Engineering," for April 1930, pages 92 to 97, inclusive, and some of the methods of testing there disclosed, are employed in the present invention. However, so far as I am aware, the testing devices employed in the prior art have had no relation to each other, while according to the invention routine check tests on instruments of the type employing positive pressures and on other instruments employing negative pressures, may be readily accomplished by a single portable testing set unit employing a pump, with a means for producing either positive, or negative pressure in a test line, adapted to be connected to an instrument to be tested. And the invention further incorporates a means for disconnecting a motor drive from the pressure testing pump and connecting the motor drive to a known type of tachometer testing device, the said motor drive incorporating a speed control means operable for either the fluid pressure tests, or tachometer testing.

Other objects and novel features of the invention will be pointed out or become apparent by reference to the construction, combination and arrangement of parts hereinafter fully described and illustrated in the drawings in which:

Fig. 2 illustrates a view of a control valve assembly taken on line 2—2 of Fig. 1, and;

Fig. 3 illustrates a view of the clutch and tachometer drive means taken on line 3—3 of Fig. 1, and;

Fig. 4 is a sectional view taken on line 4—4 of Fig. 3, and;

Fig. 9 illustrates an altimeter testing chamber for use with the system illustrated in Fig. 5, and;

Fig. 10 illustrates a modification of the altimeter testing device of Fig. 6, arranged for testing rate of climb indicators as well as altimeters.

Figure 1:
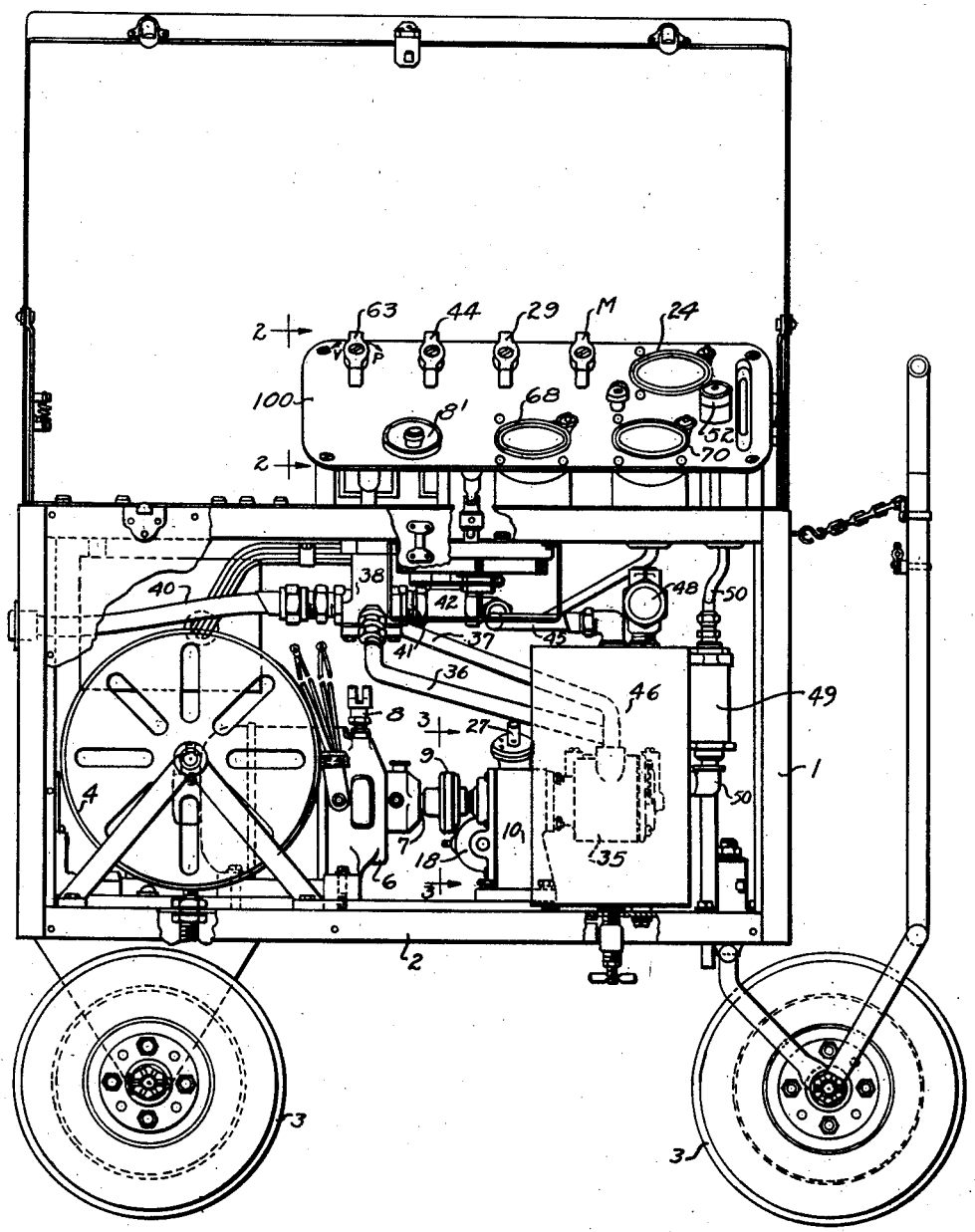
Fig. 1 illustrates a side elevation of the portable testing unit with the principal elements thereof mounted on a wheeled carriage or dolly.

Referring to Fig. 1, the numeral 1, generally indicates a carriage or dolly, having a supporting base 2 and the whole assembly being supported by wheels 3, attached to the base 2. The front wheel is steerable and the entire assembly may be towed to any place desired on an airdrome for performing instrument check tests.

A cable drum 4, is rotatably mounted on the base 2 and serves as a reel for an electrical extension cable 5 (Fig. 5), which connects to an electric motor 6, mounted on the base 2. The cable 5, may be connected to any suitable current supply source such as an outlet box in an airplane hanger, or to the generator of a portable gasoline engine driven power supply (not shown). The motor 6, may be of either the alternating current, or direct current type, or may be of dual construction including an alternating current motor and a direct current motor contained within the same motor frame, but of course only one of the motors being in use at a time, such a construction is essential where for example only alternating current is available in the aircraft hangers, while the portable engine driven generator develops direct current. The motor 6, is provided with a power output shaft 7 and a manually actuated speed control unit 8, which in the dual type motor consists of two units, a brush shifting device in the alternating current motor and a speed control rheostat for the direct current motor unit, the two controls being separate and distinct. The motor shaft 7, is connected by a flexible coupling 9, to a plural drive clutch unit generally indicated by the reference numeral 10, which by means of a manual control 27, may drive either the tachometer drive unit 18, or the pump 35. The pump 35, has an inlet conduit 36 and an outlet conduit 37, each of which are connected to a four way control valve 38, which also connects to an air inlet, or discharge conduit 40 and a conduit 41, which is connected to a rotary plug valve 42, which in turn is connected by a conduit 45 with an air reservoir 46. The reservoir 46 is provided with an outlet conduit 50, having a filter 49, inserted therein. The conduit 50, is connected in an instrument test system hereinafter more fully described.

The various master test instruments, valve and speed control means, etc., are mounted on an instrument board 100, supported on the main frame of the dolly 1.

Fig. 2 illustrates the arrangement of the control valve 38 and a control valve 57, in the device of Fig. 1, for simultaneous manual actuation. A valve rod 62, rotatably connecting the rotatable valve plugs 39 and 58 of the respective valves 38 and 57, is actuated by a control knob 63, on the instrument panel 100.

Figure 5:
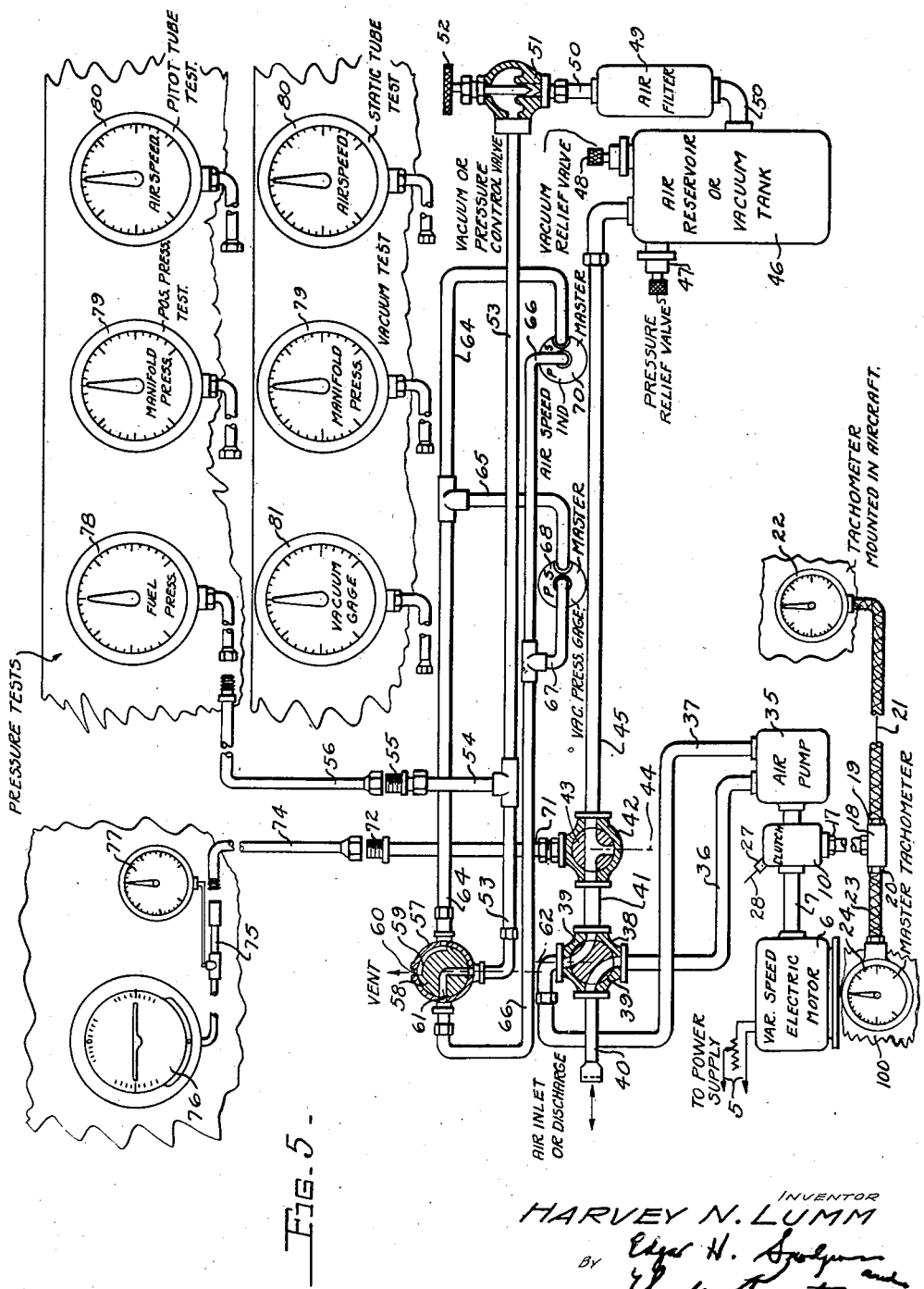
Fig. 5 illustrates schematically the arrangement of the principal components of the invention.

Figs. 3 and 4 illustrate the clutch mechanism 10, of Fig. 1, for driving the pump 35, or the tachometer drive 18. The flexible coupling 9, driven by the motor shaft 7, connects to a clutch driving shaft 11, which has an annular sleeve 12, slidably keyed thereon and the sleeve is provided at one end with teeth 13, which mesh with corresponding teeth 14, on the face of a spiral tooth gear 15, loosely rotatably mounted concentric with shaft 11. The gear 15, meshes with a gear 16, which rotates in a plane perpendicular to the plane of gear 15 and drives a shaft 17, which serves as a drive shaft for the tachometer drive 18. The tachometer drive 18, has two tachometer drive take-offs 19 and 20, arranged at right angles and respectively adapted to drive a test tachometer cable 21 and a master tachometer cable 23 (Fig. 5). By shifting the sleeve 12, axially to the right as seen in Fig. 4, the teeth 13 and 14 will be de-meshed and the tachometer drive will be disconnected from motor 6 and continued shifting of the sleeve 12, to the right, will cause the teeth 30, on the right end of the sleeve 12, to mesh with corresponding teeth 31, on the face of a driving flange 32, adapted to drive the pump 35. The sleeve 12, is provided with a central annular groove 25, for receiving an eccentric disc 26, located on the end of a shaft element 27, mounted in the clutch casing 10, in a plane at right angles to the axis of the shaft 11 and sleeve 12. The shaft element 27, is adapted to be rotated by a rod 28, secured to the knob 29 (Fig. 1), rotation of the shaft 27 and its eccentric portion 26, shifting the sleeve 12, to either drive the tachometer take-off 18, or the pump 35.

Referring now to Fig. 5, in which the general arrangement of the elements of the test set is schematically shown: The clutch 10, may drive the shaft 17 and tachometer drive 18, as previously noted and the tachometer take-off connection 19, drives a test tachometer cable 21, which may be connected to drive a tachometer 22, mounted on the instrument board of the airplane and the calibration of which it is desired to check. The tachometer take-off 20, connects to a tachometer cable 23, which drives a master tachometer 24, mounted on the instrument panel 100, of the portable testing set.

As above noted the clutch 10, may be engaged to drive the air pump 35, which may be of any suitable type, such as a vane pump or a diaphragm pump. Where a vane, or other pump of the type requiring lubrication is employed, oil may be injected into the inlet side of the pump and separated out of the air discharged from the pump, by an oil separating means not shown in the drawings. Where a diaphragm type of pump is employed, no oil will come in contact with the air being pumped, and a separator will not be required. The inlet conduit 36 and the outlet conduit 37, of the pump 35, are each connected to the plug valve 38, which is also connected to an inlet-discharge pipe 40 and to a conduit 41, which in turn is connected to the rotary plug valve 42, conduit 45 and the air reservoir, or vacuum tank 46. The valve plug 39, of the valve 38, is provided with two valve passages and in the position shown in Fig. 5, the conduit 40, is connected to the inlet conduit 36, of the pump 35 and the pump receives air from the outside atmosphere through the conduits 40 and 36. The air discharged from pump outlet conduit 37, is conducted by the other passage in the valve plug 39, to the conduit 41 and with the valve plug 43, in the position shown in Fig. 5, the air will pass to conduit 45 and reservoir tank 46 and will build up a pressure determined by a pressure relief valve 47, connected to the tank 46. Air under pressure from tank 46, passes through an outlet line 50, having a filter 49, incorporated therein. The outlet line 50, is connected to a vacuum or pressure control valve 51, the needle valve of which is actuated by a control knob 52, on the instrument panel 100 (Fig. 1). The valve 51, is connected to a conduit 53, which connects to a gage control valve 57 and the conduit 53, also connects to a branch conduit 54, which terminates in a hose connection fitting 55, to which a flexible test hose 56, of any suitable length may be connected. The test hose 56, may be connected to any one of the various instruments which are to be tested and indicated in Fig. 5, by reference numerals 78 to 81, inclusive. The gage valve 57, is connected to a conduit 66 which is connected to the pressure connection P, of a master air speed indicator 70. The conduit 66, is also connected in parallel to a branch conduit 67, which connects to the pressure side P, of a master vacuum-pressure gage 68. The valve 57, is also connected to a conduit 64, which is connected to the suction connection S, of the master air speed indicator 70 and also connected in parallel with the branch conduit 65, which is connected to the suction side S, of the master vacuum-pressure gage 68. The gage control valve 57, is provided with a rotary valve plug 58, which has a passage 61, formed therein, and in the position shown in Fig. 5, connects conduit 53, with the conduit 66 and the pressure sides of the master gage 68 and the master air speed indicator 70. Rotation of the valve plug 58, through ninety degrees in a counterclockwise direction will cause passage 61, in the valve plug 58, to connect the conduit 53, to the conduit 64 and the suction sides of the master gage 68 and the master air speed indicator 70. The valve plug 58, is provided with a groove 59, which always remains in communication with the vent opening 60, formed in the valve casting. With the valve plug 58, in the position shown in Fig. 5, the groove 59, vents the conduit 64 and the suction sides of the master gage 68 and the master air speed indicator 70, to the atmosphere through the vent opening 60. When the valve plug 58, is rotated so as to connect the conduits 53 and 64, the conduit 66 and the pressure sides of the master gage 68 and the master air speed indicator 70, will be vented to atmosphere through the groove 59, of valve plug 58 and vent opening 60.

With the parts as shown in Fig. 5 air under pressure from tank 46, will appear in conduit 53, when valve 51, is opened and air under pressure will flow into the conduit 54 and test hose 56 and to the instrument connected thereto. Air under pressure will also flow from conduit 53, through valve 57, to conduit 66 and to master vacuum-pressure gage 68, and master air speed indicator 70, on the pressure sides thereof, thus permitting the readings thereof to be compared with the instrument being tested.

If now it is desired to make an instrument test, in which a vacuum of low value is required, the valve plug 39, of the valve 38, is rotated counterclockwise from the position shown in Fig. 5, through an angle of ninety degrees by actuation of the knob 63 (Figs. 1 and 2) and valve plug 58, of valve 57, will also be rotated an equal amount in the same direction. The pump inlet conduit 36, will now be connected to the tank 46, through conduit 45, valve 42 and conduit 41, so that the pump 35, will create a vacuum in tank 46, limited by the vacuum relief valve 48. A vacuum will then exist in conduits 50, 53 and 54 and in test hose 56. The valve plug 58, of valve 57, is now in the position to connect conduit 64 and the suction sides of the master vacuum-pressure gage 68 and master air speed indicator 70, to the conduit 53 and to the vacuum condition existing therein, the positive pressure gage line 66, being vented to the atmosphere in the manner above described.

Air withdrawn from the system through inlet conduit 36, is discharged from the discharge side of the pump 35, through conduit 37, valve plug 39 and the conduit 40, to the atmosphere.

In view of the above disclosure it is evident that a fluid pressure either above or below atmospheric pressure, may be created in the test hose 56 and the value of this pressure either in terms of absolute pressure, or in terms of velocity in miles per hour, as indicated respectively by the master vacuum-pressure gage 68 and the master air speed indicator 70, may be measured. The total range of the vacuum-pressure gage 68, is about 10 inches of mercury, or roughly 5 lbs. per square inch absolute, which range has been found satisfactory for all necessary routine check tests.

During a test any desired pressure, or vacuum within the instrument range may be maintained by actuation of the control valve 51, which can be completely closed upon the desired pressure, or vacuum condition being attained the pressure relief valve 47, or vacuum relief valve 48, preventing an overloading of the continuously running pump 35 and motor 6. The proper pump speed may be adjusted by actuation of the speed control 8, of motor 6, by the control knob 8' on the instrument panel 100 (Fig. 1).

For testing air turbine driven gyroscopes in various instruments such as pitch and turn indicators, a comparatively large vacuum is necessary and to provide such a vacuum, the valve 42, is employed. As seen in Fig. 5, the valve 42, is connected to a conduit 71, provided with a terminal connection 72, to which a flexible test hose 74, may be connected. The valve 42, is provided with rotatable valve plug 43, formed with a T shaped passage and when the valve plug 43, is rotated ninety degrees in a clockwise direction from the position shown in Fig. 5, the conduit 41, is directly connected to the conduit 71 and test hose 74 and the remainder of the test system is blocked off from communication with the pump 35. With the valve 38, in the suction position, i. e., connecting conduit 36, to conduit 41, a vacuum will be produced in the conduit 71 and the test hose 74. The degree of vacuum is regulated by control of the speed of the pump and by means of the relief valve provided in the airplane on the vacuum line leading to the instruments. The vacuum gage provided on the instrument, or separately mounted on the aircraft instrument panel gives the indication of the suction pressure applied to the instruments. By leaving the valve 38, in the pressure position as shown in Fig. 5 and rotating the valve plug 43, to the position above described, a positive pressure of a higher magnitude could be developed in the test hose 74, if for any reason such a pressure were required for testing purposes.

By means of the above described fluid pressure system, it is seen that we may develop a predetermined pressure, or vacuum, within a desired test range in the test hose line 56 and we may also develop a high vacuum in the test line 74, for testing instruments requiring a high vacuum, by manipulating the control valves provided.

OPERATION

Tachometer testing

In order to test the engine tachometer, or tachometers, on an aircraft with the portable field test set, the extension flexible test cable 21, is connected to drive the tachometer to be tested indicated by numeral 22, by connecting the test cable to the tachometer drive cable at the engine driving connection, or in the case of an electrical tachometer by disconnecting the generator unit from the engine drive and connecting the generator to the test tachometer cable 21. The clutch control knob 29, on the control panel 100 (Fig. 1), is then actuated, to cause clutch 10, to connect motor 6, to drive tachometer drive 18, in the manner previously described. The motor 6, is then energized by actuation of a suitable switch, controlled by knob M (Fig. 1), the motor being connected to a suitable power source by means of cable 5, in the manner previously noted. The speed of motor 6, is then adjusted to a desired value by actuating the motor speed control knob 8'; which adjusts motor speed controller 8. The motor speed or a multiple thereof is then indicated on the master tachometer and this speed is compared with the speed indicated by the tachometer 22, to be tested. Various speeds may be checked by varying the motor speed in the manner above described.

Pressure tests

In order to accomplish pressure tests on instruments such as a fuel pressure gage, manifold pressure gage, or air speed indicator (Pitot tube side) as indicated in Fig. 5 by the legend Pressure tests, the test hose 56, is connected to the pressure line of the instrument to be tested and the valve control knob 63 (Fig. 1), is actuated so as to place the valves 38 and 57, in the position for a pressure test and the knob 44 (Fig. 1), actuated to position the valve 42, in the position shown in Fig. 5. The pump 35, is connected to motor 6, by manual actuation of the clutch 10, by control knob 29 (Fig. 1), in the manner previously described. The control valve 51, is closed by actuation of the knob 52 (Fig. 1) and the motor 6, is energized and adjusted to a suitable speed by motor speed control 8. The valve 51, is then slowly opened and the pressure, and/or air speed indicated by the instrument to be tested is checked against the pressure reading of the master vacuum-pressure gage 68, or the air speed indicator 70. By closing valve 51, after a predetermined pressure is reached, instrument casing or line leaks may be detected by noting whether the instrument maintains the reading for a certain period of time. If leaks are detected, the test hose may be connected directly to the instrument being tested, to determine if the leak is in the instrument casing, if this test is satisfactory then the leak in the line must be traced.

*Vacuum tests on instruments other than air driven gyro-instruments*

Instruments requiring a test pressure below atmospheric pressure, or a vacuum, are vacuum gages, manifold pressure gages, air speed indicator (static pressure side) and instruments such as rate of climb indicators connected to the static pressure line. Manifold pressure gages on modern high power engines must be tested for both positive and negative pressure due to the fact, that the manifold pressure may be negative and change to positive pressure upon using a moderate degree of supercharging, hence both pressure and vacuum tests are often required. Some of the instruments requiring vacuum tests are indicated in Fig. 5 by the numerals 80 to 81, inclusive. The test hose 56, is connected to the instrument lines, except that in making the connection for either pressure or vacuum test on the air speed indicator 80, a connection is made to the Pitot static head in a manner hereinafter described.

The procedure for the vacuum test is exactly the same as for making a pressure test, as above described, except that the valve plug 39, of the valve 38, is positioned by knob 63 (Fig. 1), to connect the pump inlet conduit 36, to the conduit 41, to produce a vacuum in test hose 56 and valve plug 58, is positioned by knob 63, to connect conduit 53, with conduit 64 and the suction sides of master vacuum-pressure gage 68 and master air speed indicator 70, in the manner previously described. Needle valve 51, is initially closed and is gradually opened allowing a vacuum to gradually be produced in the test hose 56. The readings of the master gage 68 and the master air speed indicator 70, are compared with the reading of the instrument in the airplane.

*Procedure for testing gyro instruments*

As above noted in the description of Fig. 5, in order to test the air driven gyros employed in a number of instruments a rather high vacuum is required, so that for such tests, the test hose 74, is employed and if the source of vacuum employed for driving the gyros is an engine driven pump, the vacuum line 75 is disconnected at the pump and connected to the test hose line 74. If the instrument vacuum line 75, is connected to a Venturi tube mounted on the exterior of the aircraft, the test hose is connected by a novel fitting in a manner hereinafter described. The procedure for obtaining a vacuum in the test hose 74, has been above described with reference to Fig. 5, i. e., placing the valve plug 39, in the vacuum test position and rotating the valve plug 43, of valve 42, in a clockwise direction as seen in Fig. 5, by actuation of knob 44 (Fig. 1) thus placing conduit 41, in communication with test conduit 71 and test hose 74. Clutch 10, is engaged to connect pump 35, to be driven by motor 6 and the motor speed is adjusted so that a proper suction on the instrument, or instruments 76, is indicated on the vacuum gage 77, mounted on the airplane instrument panel, or incorporated in the instrument case. The suction on the instruments is then adjusted by actuation of the relief valve on the airplane.

Figure 6:
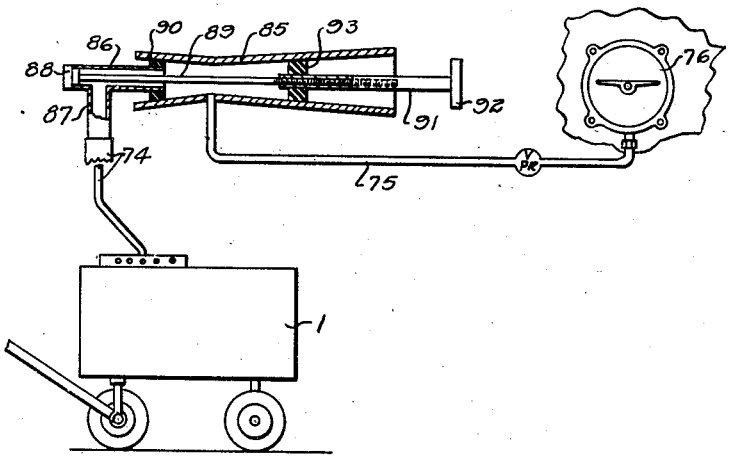
Fig. 6 illustrates a novel means for attaching a test hose from the testing unit to a Venturi tube serving as a suction source for gyro instruments.

Fig. 6 illustrates the means for attaching the vacuum test line 74, of the portable test set 1, to test air turbine gyro instruments employing a Venturi tube mounted on the exterior of the aircraft, as a suction source. The Venturi tube 85, is connected to the instrument suction line 75 and in flight air flowing at high velocity through the Venturi tube causes a high vacuum at the Venturi throat, which produces a vacuum in the instrument suction line and to produce an equivalent test suction in the instrument line 75, without disconnecting the line from the venturi, a novel Venturi sealing means is employed. The sealing means comprises a tubular member 86, having a branch connection 87, to which the test hose 74, may be attached. The inner end of the tubular member 86, is open and its outer end is closed by a plug 88, which also has formed therewith an extension rod 89, threaded at its outer end. A tapered annular rubber plug 90, is mounted on the inner end of the tubular member 86 and is suitably secured in sealing relation thereto by vulcanizing or clamping. A sleeve member 91, having a longitudinal threaded bore adapted to be screwed onto the threaded end of the rod 89, is provided with an enlarged knob 92, at its outer end. A tapered annular rubber plug 93, is mounted on the sleeve 91, adjacent its inner end and bonded thereto. The sealing device is assembled by inserting the rod 89 and rubber plug 90, into the front of the Venturi tube, until the plug 90 engages the tapered wall of the Venturi tube, the sleeve member 91, is then inserted in the rear Venturi opening and threaded onto the end of rod 89, by turning knob 92, until the plug 93, comes into tight sealing engagement with the inner walls of the Venturi tube. The Venturi tube is thus sealed from the outside atmosphere, while the throat of the venturi and suction line 75, are in free communication with the interior of tubular member 86 and connection 87. The test hose 74, may then be connected to the connection 87 and the test may be performed in the manner above described. The use of the above fitting greatly facilitates testing, since it is not necessary to disconnect any parts of the instrument suction system in order to make the gyro test.

Figure 7:
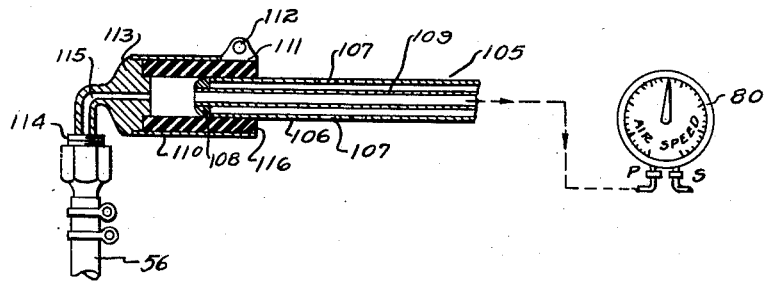
Fig. 7 illustrates a novel means for attaching a test hose to the Pitot tube of a Pitot-static head.

Fig. 7 illustrates the means for making the Pitot tube, or pressure test on the air speed indicator 80, with the portable test set, without it being necessary to break any connections in the airplane, the test hose 56, being connected by a novel fitting to the Pitot tube, of the Pitot-static head, usually mounted on a bracket secured to the airplane wing. The Pitot static head is generally indicated by the reference numeral 105 and generally comprises an outer tubular member 106, provided with static pressure openings 107, communicating with the outside atmosphere and the tube 106, adapted to be connected by a suitable conduit to the static pressure side S, of the airspeed indicator 80, the outer end of the static pressure tube 106 being closed by the annular head 108, which serves also to seal the tube 106, from the inner dynamic pressure, or Pitot tube 109, which is adapted to be connected to the pressure or Pitot side of the air speed indicator 80. The fitting for connecting the test hose 56, to the Pitot tube 109, comprises a thin tubular sleeve 110, which is closed at one end by the head 113, which terminates in a conventional screwed connection 114, to which the hose line 56, may be attached. The head 113, is provided with a central passage 115, which affords a communication between the Pitot tube and the test hose. The sleeve 110, is provided with a hollow annular sleeve made of rubber, or similar material. The sleeve 110, is slotted as at 111, for a portion of its length and is provided with the ears 112, on opposite sides of the slotted portion. One of the ears 112 is formed with a suitable threaded opening so that the ears may act in conjunction with a screw (not shown) to compress the rubber sleeve 116, tightly around the static pressure tube 106, thus sealing the Pitot tube 109, from the outside atmosphere. By connecting the test hose 56, to the connection 114, the pressure test of the air speed indicator 80, may proceed in the manner above described.

Figure 8:
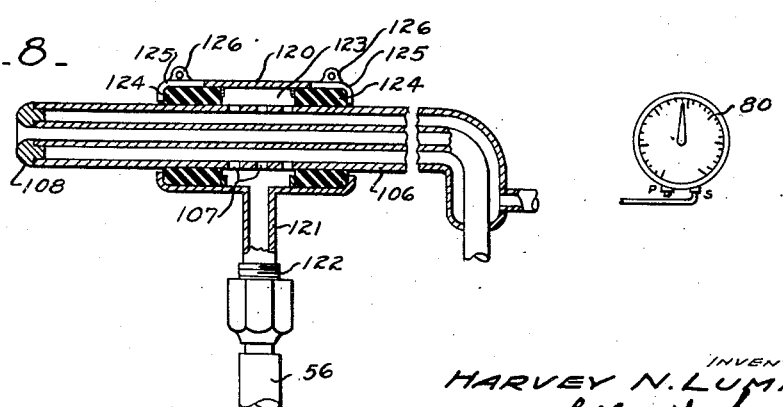
Fig. 8 illustrates a novel means for attaching a test hose to the static tube of a Pitot-static head.

Fig. 8 illustrates the means for connecting the test hose 56, to the static tube 106, of the static head 105, in order to carry out the vacuum, or static pressure tube test of the air speed indicator 80, or a rate of climb indicator, which as a rule also connects to the static pressure line. The connecting device comprises, a metal sleeve 120, which adjacent each end has an annular rubber sealing ring 124, the rings being spaced to leave a chamber or space 123, therebetween. A branch pipe 121, having a screwed connection 122, at its lower end communicates with the space or chamber 123. The sleeve 120, is slotted at each end as at 125 and provided with screw clamping lugs 126, so that the sleeve 120 and rubber sealing element 124, may be slipped over the static pressure tube 106, so that the static pressure openings 107, lie intermediate the sealing rings 124. By clamping the sealing rings 124, by means of screws (not shown) cooperating with the lugs 126, the chamber 123, is effectively sealed from leakage along the static pressure tube and by connecting test hose 56, to the tube 121, the vacuum test of air speed indicator 80, may proceed in the manner above described.

Fig. 9 illustrates the use of a vacuum test chamber in conjunction with the portable testing set, for testing the calibration of altimeters and such equipment will of course only be necessary where the portable test set is used at a place where instrument calibration equipment is not available. The altimeter testing equipment comprises a metal chamber 150, provided with a heavy glass observation window 151. At one end the chamber is provided with a removable closure 152, which permits an altimeter 160 and a master altimeter 161, to be inserted into the chamber and sealed from the outside atmosphere by clamping on the closure 152. At its other end the chamber 150, is provided with a pipe connection 153, to which may be connected a conduit 154, having a control valve 155, inserted therein. The conduit 154, is connected to an outlet 156, of the tank 46, of the portable test set 1, above described.

The altimeter 160, to be tested, is inserted in the chamber 150, along with the master altimeter 161 and the closure 152, clamped in place, the needle valve 155, and valve 51, of the portable test set are then closed and the vacuum relief valve 48, on the reservoir 46, is set, so that a high vacuum may be produced in the reservoir, or tank 46. The pump 35, is placed in operation with the control valves 38, 42 and 51, placed in the vacuum test position. The pump 35, will then evacuate reservoir, or tank 46 and test chamber 150 and by regulating valve 155, the vacuum in the test chamber may be varied.

During the test the reading of altimeter 160, is compared with the reading of master altimeter 161. The action of the altimeter during a descent can be checked by opening valve 155, thus venting the test chamber to the atmosphere. It should also be noted that in place of connecting the test chamber 150, conduit 154 and valve 155, to the reservoir or tank 46, they may instead be connected to the high vacuum gyro test connection 72.

Fig. 10 illustrates a modification of the altimeter testing device of Fig. 9, so that rate of climb indicators may be tested. The only change in the system illustrated in Fig. 9, is that a valve and leak assembly 170, is inserted in series with conduit 154, in place of the valve 155, of Fig. 9. The assembly 170, includes a capillary leak tube 172, controlled by a needle valve 173, which may be adjusted to vary the rate of discharge through the capillary tube.

The test is carried out by inserting a master altimeter 161, a master rate of climb indicator 175 and a rate of climb indicator 176, to be tested, in the test chamber 150. The chamber 150, is then evacuated in the manner described above with reference to Fig. 9 and upon a pressure equivalent to some desired altitude being attained, as indicated by the master altimeter 161, the valve 42, (Fig. 5) is adjusted to block the conduit 45 and the volume of both tank 46 and chamber 150, is available as a fluid pressure source. The needle valve 173, is then opened to obtain a desired rate of change of pressure within the test chamber, which will be indicated as a rate of climb on the master rate of climb indicator 175 and the indication of the rate of climb indicator 176, is compared with the reading of the master instrument 175.

The portable test unit also incorporates a manually operated pump for testing oil pressure gages, against the reading of a master gage connected to the pump and a conventional thermometer testing unit is also provided, but neither of these units form a part of the invention claimed herein.

I have disclosed a portable testing unit for testing aircraft instruments, which is very compact and proven in service to greatly facilitate routine tests necessary in the proper maintenance of aircraft, due to the fact that a single test apparatus is adapted to make a plurality of different type of tests. The various tests are of course mainly for the purpose of determining if the errors of the instruments are within prescribed limits and not to perform exact calibration checks, which should only be attempted in a specially equipped instrument laboratory.

While only one principal form of the invention has been illustrated in the drawings, it will be apparent to those skilled in the art, that other modifications may be made coming within the scope of the invention as defined by the appended claims.

I claim:

1. In an instrument testing device of the character described a fluid conduit adapted to be connected to a vacuum or pressure responsive indicating instrument to be tested, a pump, a first valve means connecting said pump and said fluid conduit and operative in one position to cause said pump to create a fluid pressure above atmospheric pressure within said conduit and operative in a second position to evacuate said fluid conduit to a pressure below atmospheric pressure, a master fluid pressure measuring means including a positive pressure conduit and a negative pressure conduit, a second valve means for respectively connecting said positive pressure and said negative pressure conduits to said fluid conduit and means for simultaneously actuating said first and second valve means such that when said first valve means is in said one position said second valve means connects said positive pressure conduit to said fluid conduit and when said first valve means is in said second position said second valve means connects said negative pressure conduit to said fluid conduit.

2. The structure as claimed in claim 1, in which said second valve means includes a vent communicating with the atmosphere and arranged such that when when said valve is in a position to connect one of said positive or negative pressure conduits to said fluid conduit the other of said positive or negative pressure conduits will be vented to the atmosphere.

3. The structure as claimed in claim 1, including an adjustable variable speed power means for driving said pump.

4. The structure as claimed in claim 1, including an air reservoir connected in said fluid conduit between said first and said second valve means.

5. The structure as claimed in claim 1, including pressure relief valve means operative to limit the positive and negative fluid pressures developed in said conduit to predetermined maximum values.

6. The structure as claimed in claim 1, including a flow restricting valve means inserted in said fluid conduit between said first and said second valve means.

7. The structure as claimed in claim 1, including an air reservoir connected in said fluid conduit between said first and second valve means, a vacuum relief valve and a pressure relief valve connected to said air reservoir and a flow restricting valve inserted between said air reservoir and said second valve means.

8. In an instrument testing device for testing pressure-responsive instruments and the like, a test fluid-pressure conduit adapted to be connected at one end thereof to pressure or vacuum instruments to be tested, a continuously driven pump operatively connected to said test fluid-pressure conduit, means for selectively causing said pump to develop a pressure above or below atmospheric pressure in said test conduit, a reservoir connected to said conduit in the line of flow therethrough, a restricting valve for restricting the flow in either direction through said test conduit, master fluid pressure measuring means, and a connection between said measuring means and said test conduit; including a pressure conduit for measurement of pressure above atmospheric pressure, a suction conduit for measurement of pressure below atmospheric pressure and valve means operable to selectively connect either of said pressure or suction conduits to the test fluid pressure conduit and to vent the other of said conduits to the atmosphere.

9. In an instrument for testing pressure-responsive instruments and the like, a test fluid-pressure conduit adapted to be connected at one end thereof to pressure or vacuum instruments to be tested, a continuously driven pump operatively connected to said test fluid-pressure conduit, means for selectively causing said pump to develop a pressure above or below atmospheric pressure in said test conduit, a reservoir connected to said test conduit in the line of flow therethrough, a restricting valve for restricting flow through said conduit in either direction, master fluid-pressure measuring means, and a connection between said measuring means and said test conduit; including a pressure conduit for measurement of pressure above atmospheric pressure, a suction conduit for measuring pressure below atmospheric pressure, valve means operable to selectively connect either of said pressure or suction conduits and to vent the other of said conduits to the atmosphere and means connecting said valve means with the means for selectively causing said pump to develop a fluid pressure above or below atmospheric pressure in said test fluid-pressure conduit for simultaneous operation therewith.

HARVEY NEWTON LUMM.